(12) United States Patent
Mule et al.

(10) Patent No.: US 7,016,569 B2
(45) Date of Patent: Mar. 21, 2006

(54) BACK-SIDE-OF-DIE, THROUGH-WAFER GUIDED-WAVE OPTICAL CLOCK DISTRIBUTION NETWORKS, METHOD OF FABRICATION THEREOF, AND USES THEREOF

(75) Inventors: Tony Mule, Atlanta, GA (US); James D. Meindl, Marietta, GA (US); Thomas K. Gaylord, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 10/630,411

(22) Filed: Jul. 30, 2003

(65) Prior Publication Data

US 2004/0071387 A1    Apr. 15, 2004

Related U.S. Application Data

(60) Provisional application No. 60/399,975, filed on Jul. 31, 2002.

(51) Int. Cl.
    *G02B 6/34*    (2006.01)
(52) U.S. Cl. ............................ 385/37; 385/14; 385/15; 385/24; 385/31; 385/39
(58) Field of Classification Search ............ 385/14–15, 385/31–38, 49–50, 129–132; 398/43, 66–68, 398/74–75, 79–87
See application file for complete search history.

(56) References Cited

U.S. PATENT DOCUMENTS

| 4,959,540 | A |   | 9/1990  | Fan et al. ............... 250/227.12 |
| 5,250,816 | A |   | 10/1993 | Kitamura ..................... 257/81 |
| 5,293,626 | A |   | 3/1994  | Priest et al. ................ 395/550 |
| 5,325,225 | A | * | 6/1994  | Suzaki et al. ............... 398/195 |
| 5,416,861 | A |   | 5/1995  | Koh et al. ..................... 385/14 |
| 5,430,567 | A |   | 7/1995  | Shaw et al. ................. 359/107 |
| 5,434,524 | A |   | 7/1995  | Shaw et al. ................. 327/187 |
| 5,508,835 | A |   | 4/1996  | Takahashi et al. .......... 359/140 |
| 5,515,194 | A |   | 5/1996  | Kanterakis et al. ......... 359/127 |
| 5,537,498 | A |   | 7/1996  | Bausman et al. ............. 385/24 |
| 5,677,778 | A |   | 10/1997 | Kanterakis et al. ......... 359/127 |
| 5,708,671 | A |   | 1/1998  | Siao et al. .................... 372/20 |
| 5,812,708 | A |   | 9/1998  | Rao ............................ 385/14 |
| 5,889,903 | A |   | 3/1999  | Rao ............................ 385/14 |
| 6,008,918 | A |   | 12/1999 | Kanterakis et al. ......... 359/117 |
| 6,125,217 | A |   | 9/2000  | Paniccia et al. .............. 385/14 |

(Continued)

OTHER PUBLICATIONS

J. Liu, R. Chen, "Substrate Guide-Wave-Based Optical Interconnects for Multiwavelength Routing and Distribution Networks," Journal of Lightwave Technology, vol. 17, No. 2, Feb. 1999.*

(Continued)

*Primary Examiner*—Frank G. Font
*Assistant Examiner*—Ryan Lepisto
(74) *Attorney, Agent, or Firm*—Thomas, Kayden, Horstemeyer & Risley, LLP

(57) ABSTRACT

Systems and methods for back-of-die, through-wafer guided-wave optical clock distribution systems (networks) are disclosed. A representative back-of-die, through-wafer guided-wave optical clock distribution system includes an integrated circuit device with a first cladding layer disposed on the back-side of the integrated circuit device, and an core layer disposed on the first cladding layer. The core layer, the first cladding layer, or the second cladding layer can include, but is not limited to, vertical-to-horizontal input diffraction gratings, a horizontal-to-horizontal diffraction gratings, and horizontal-to-vertical output diffraction gratings.

39 Claims, 4 Drawing Sheets

C-C Cross Section

U.S. PATENT DOCUMENTS

| | | | | |
|---|---|---|---|---|
| 6,330,265 | B1 * | 12/2001 | Kinoshita | 372/50 |
| 6,351,576 | B1 * | 2/2002 | Ding | 385/14 |
| 6,690,851 | B1 * | 2/2004 | Guilfoyle | 385/18 |
| 6,829,286 | B1 * | 12/2004 | Guilfoyle et al. | 372/108 |
| 2002/0067882 | A1 * | 6/2002 | Guilfoyle | 385/24 |
| 2003/0012539 | A1 * | 1/2003 | Mule' et al. | 385/129 |
| 2003/0034538 | A1 * | 2/2003 | Brophy et al. | 257/444 |

OTHER PUBLICATIONS

C. Zhao, R. Chen, "Performance Consideration of Three-Dimensional Optoelectronic for Intra-Multichip-Module Clock Signal Distribution," Applied Optics, vol. 36, No. 12, Apr. 1997.*

A. Mule, E. Glytsis, T. Gaylord, J. Meindl, "Electrical and Optical Clock Distribution Networks for Gigascale Microprocessors," IEEE Transactions on Very Large Scale Integration (VLSI) Systems, vol. 10, No. 5, Oct. 2002.*

"Input Coupling and Guided-wave Distribution Schemes for Board-level Intra-chip Guided-Wave Optical Clock Distribution Network Using Volume Grating Coupler Technology", Mule et al, Proceedings of the IEEE, Jun. 2001, p. 128-130.*

Thomas K. Gaylord, *Analysis and Applications of Optical Diffraction by Gratings*, Proceedings of the IEEE, vol. 73, No. 5, May 1985.

* cited by examiner

C-C Cross Section

D-D Cross Section

BACK-SIDE-OF-DIE, THROUGH-WAFER GUIDED-WAVE OPTICAL CLOCK DISTRIBUTION NETWORKS, METHOD OF FABRICATION THEREOF, AND USES THEREOF

CROSS-REFERENCE TO RELATED APPLICATION

This application claims priority to U.S. provisional application entitled, "UNFUOCUSED GUIDED-WAVE OPTICAL CLOCK DISTRIBUTION NETWORK AND METHOD," having Ser. No. 60/399,975, filed on Jul. 31, 2002, which is entirely incorporated herein by reference.

STATEMENT REGARDING FEDERALLY SPONSORED RESEARCH OR DEVELOPMENT

The U.S. government may have a paid-up license in this invention and the right in limited circumstances to require the patent owner to license others on reasonable terms as provided for by the terms of MDA972-99-1-0002 awarded by the DARPA.

TECHNICAL FIELD

The present invention is generally related to clock distribution networks and more particularly, the present invention is related to guided-wave optical clock distribution networks employing a back-side-of-die core layer that communicates with optical sources through the device substrate upon which it resides, methods of fabricating back-side-of-die guided-wave optical clock distribution networks employing through-wafer communication, and methods of use thereof.

BACKGROUND OF THE INVENTION

A clock distribution network is required for controlling the flow of data along critical logic paths in high-speed integrated circuit devices such as microprocessors and application specific integrated circuits, for example. However, current clock distribution networks suffer from unknown (or unpredictable) components of global and local skew and jitter. Extrapolated trends of skew and jitter for high performance microprocessors, for example, indicate a need for clock distribution networks that can reduce or eliminate unknown components of timing uncertainty for systems operating with local clock frequencies greater than 20 GHz. A reference related to such trends can be found in A. V. Mule, E. N. Glytsis, T. K. Gaylord, and J. D. Meindl, *IEEE Transactions on Very Large Scale Integration (VLSI) Systems*, vol. 10, no. 5, pp. 582–594, October 2002.

Intra-chip optical clock distribution networks previously investigated in the literature propose the use of global guided-wave distribution systems that communicate over a fixed-fanout distribution with optoelectronic receivers. Such distribution systems may address only a limited portion of the timing uncertainty associated with global and semi-global levels of electrical wiring and clock drivers, as the varying path length and internal scattering may contribute additional skew and jitter that matches or even exceeds that of the purely electrical system. In addition, optoelectronic receivers contribute additional electrical power dissipation, which unless managed properly, may negate any power reduction achieved by using optics.

Thus, a heretofore unaddressed need exists in industries employing clock distribution systems that addresses the aforementioned deficiencies and/or inadequacies.

SUMMARY OF THE INVENTION

Embodiments of the present invention provide systems and methods for back-side-of-die, through-wafer guided-wave optical clock distribution systems (networks). In addition, the present invention provides methods for fabricating back-side-of-die, through-wafer guided-wave optical clock distribution systems and methods of use thereof.

Briefly described, in structure, one embodiment of the system, among others, can be implemented as follows. The back-side-of-die, through-wafer guided-wave optical clock distribution system can include an integrated circuit device with a first cladding layer and a core layer disposed on the back-side of the integrated circuit device. The core layer can include, but is not limited to, vertical-to-horizontal input diffraction gratings, horizontal-to-horizontal diffraction gratings, and horizontal-to-vertical output diffraction gratings, where horizontal and vertical refer to the direction of propagation of the optical clock signal.

The present invention can also be viewed as providing methods for distributing an optical clock signal transparent to a device substrate at a global level of an integrated circuit device through a uniform, unfocused guided-wave progression, where the optical clock signal is coupled into the back-side of the die through the device substrate, distributed laterally on the back-side of the die, and is coupled vertically back through the device substrate directly to a local level of the integrated circuit device.

In this regard, one embodiment of such a method, among others, can be broadly summarized by the following steps: providing an optical clock signal and an integrated circuit device (the integrated circuit device including a device substrate, where the optical clock signal has a wavelength such that the optical clock signal can pass through the device substrate); propagating the optical clock signal vertically, through the device substrate, from the front-side of the integrated circuit device to the back-side of the integrated circuit device; distributing the optical clock signal from a vertical (i.e., perpendicular to the device surface) to horizontal (i.e., parallel to the device surface) orientation on the back-side of the integrated circuit device; distributing the optical clock signal in a plurality of horizontal directions on the back-side of the integrated circuit device through a uniform, unfocused guided-wave progression; distributing the optical clock signal from a horizontal to vertical orientation on the back-side of the integrated circuit device; and propagating the optical clock signal vertically, back through the integrated circuit device substrate, from the back-side of the integrated circuit device to the chip-level of the integrated circuit device.

Furthermore, the present invention provides methods for fabricating the back-side-of-die, through-wafer optical clock distribution systems of the present invention. One exemplary fabrication method is described in the following steps: providing a substrate having a first cladding layer disposed thereon; disposing a core layer on the first cladding layer; forming multiplexed vertical-to-horizontal input diffraction gratings within the core layer; forming horizontal-to-horizontal diffraction gratings within the core layer; forming multiplexed horizontal-to-vertical output diffraction gratings within the core layer; and disposing a second cladding layer on the core layer.

Another exemplary fabrication method is described in the following steps: providing a substrate having a first cladding layer disposed thereon; forming multiplexed vertical-to-horizontal input diffraction gratings within the first cladding layer; forming horizontal-to-horizontal diffraction gratings within the first cladding layer; forming multiplexed horizontal-to-vertical output diffraction gratings within the first cladding layer; disposing a core layer on the first cladding layer; and disposing a second cladding layer on the core layer.

Yet another exemplary fabrication method is described in the following steps: providing a substrate having a first cladding layer disposed thereon; disposing a core layer on the first cladding layer; disposing a second cladding layer on the core layer; forming multiplexed vertical-to-horizontal input diffraction gratings within the second cladding layer; forming horizontal-to-horizontal diffraction gratings within the second cladding layer; and forming multiplexed horizontal-to-vertical output diffraction gratings within the second cladding layer.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Figure 1A:
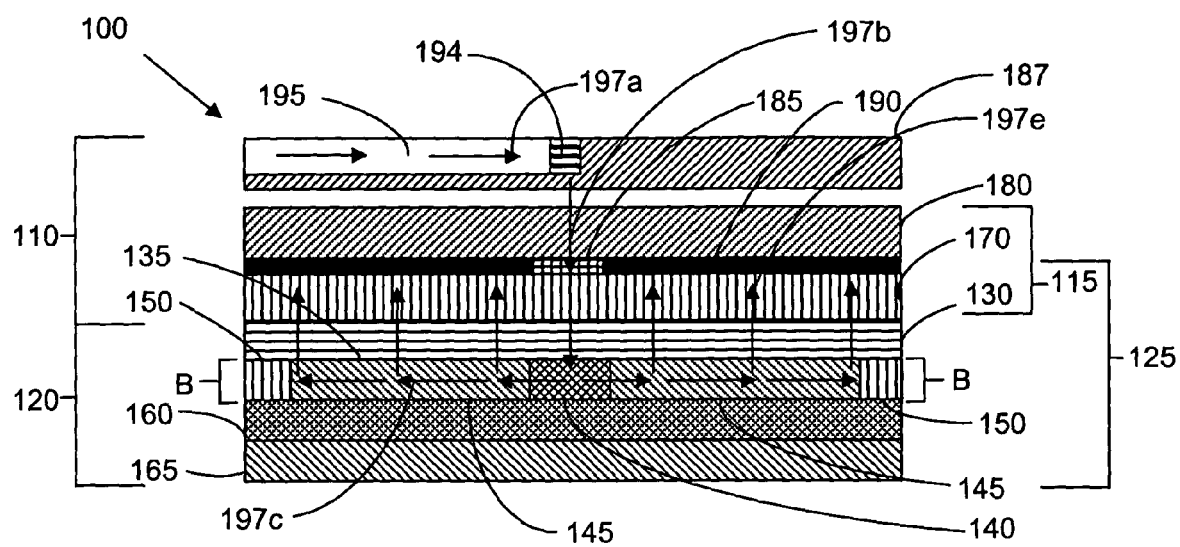
FIG. 1A is a cross-sectional view of a representative embodiment of a back-side-of-die, through-wafer guided-wave optical clock distribution system (network) with off-chip optical clock signal generation.

Devices and systems having back-side-of-die, through-wafer guided-wave optical clock distribution systems (networks) which include an optical layer (core or cladding) with at least one vertical-to-horizontal input diffraction grating, at least one horizontal-to-horizontal diffraction grating, and at least one horizontal-to-vertical output diffraction grating along the path of optical power propagation on the back-side of the die, are described herein. Clock distribution in the optical layer is accomplished through uniform, unfocused distribution of the clock signal. In addition, methods of making these devices and systems and methods of using these devices and systems are disclosed herein.

The types of devices that can use the back-side-of-die, through-wafer guided-wave optical clock distribution systems of the present invention include, but are not limited to, high speed and high performance chips such as, but not limited to, microprocessors, communication chips, optoelectronic chips, and application specific integrated circuits.

Devices having the back-side-of-die, through-wafer guided-wave optical clock distribution systems of the present invention are able to distribute optical clock signals from a global level directly to a local level by propagating the optical clock signal through the device substrate. Thus, the entire clock distribution system (including global, semi-global, and local wiring and driver distributions) can be facilitated. In addition, conventional optoelectronic receivers composed of a detector, amplification circuit and driver circuit are not required and any power dissipation, skew, or jitter associated with their integration may be avoided.

In addition, the vertical-to-horizontal input diffraction gratings and horizontal-to-vertical output diffraction gratings can be multiplexed. The horizontal-to-vertical output diffraction gratings can also incorporate increased refractive index modulation in the direction of light propagation to create a uniform blanket of out-coupled optical power directed towards optoelectronic latches that control the flow of information along critical logic paths. This blanket illumination occurs over a broad area of the device rather than at discrete, fixed points of fanout. Hence, depending on the distribution arrangement and device size, a small, fixed, and predictable (or known) skew can exist due to the difference in time-of-flight propagation between locations associated with the earliest and latest arrival times of the clock signal. As such, the design of critical path logic could be tailored such that little or no impact on timing margin due to both known and unknown components of skew and jitter could be realized.

Another feature of the back-side-of-die, through-wafer guided-wave optical clock distribution system of the present invention includes having a vertical reflection absorption layer or layers and a horizontal reflection absorption layer or layers disposed adjacent to the cladding layers. Vertical reflection absorption layers could serve to capture secondary vertical optical reflections during operational distribution of the optical clock signal. Additionally, a horizontal reflection absorption layer could serve to capture secondary optical reflections due to horizontal reflections at the edges of the core layer during operational distribution of the optical clock signal.

Now having described devices having back-side-of-die, through-wafer guided-wave optical clock distribution systems in general, examples 1, 2, and 3 describe some embodiments of devices and systems having back-side-of-die, through-wafer guided-wave optical clock distribution systems. While embodiments of devices and systems having back-side-of-die, through-wafer guided-wave optical clock distribution systems are described in connection with examples 1, 2, and 3 and the corresponding text and figures, there is no intent to limit embodiments of the back-side-of-die through-wafer optical clock distribution network to these descriptions. On the contrary, the intent is to cover all alternatives, modifications, and equivalents included within the spirit and scope of embodiments of the present invention.

EXAMPLE 1

FIG. 1A is a cross-sectional view of a representative embodiment of a back-side-of-die, through-wafer guided-wave optical clock distribution system (network) 100 with off-chip optical clock signal generation, where no on-chip routing of the optical signal occurs prior to coupling the signal to the back-side-of-die core layer from an off-chip optical source. The back-side-of-die, through-wafer guided-wave optical clock distribution system 100 includes front-side layers 110 and back-side layers 120. The front-side layers 110 include, but are not limited to, a device substrate 170, a packaging layer 180, a printed wiring board substrate 187, an optical via 185, and device circuitry 190. The back-side layers 120 include, but are not limited to, a first cladding layer 130, a core layer 135, a horizontal reflection absorption layer 150, a second cladding layer 160, and a vertical reflection absorption layer 165. The core layer 135 includes, but is not limited to, multiplexed vertical-to-horizontal input diffraction gratings 140, horizontal-to-horizontal diffraction gratings 145, and multiplexed horizontal-to-vertical output diffraction gratings 147 (as seen in FIGS. 1C and 1D). More particularly, the primary structure 125 includes, but is not limited to, the optical via 185, the device circuitry 190, the device substrate 170, and the back-side layers 120. Specifically, the package layer 180, the optical via 185, the device circuitry 190, and the device substrate 170 could be included in an integrated circuit device 1115, for example. Additional details regarding the spatial relationship of the components of the back-side-of-die, through-wafer guided-wave optical clock distribution system 100 depicted in FIG. 1A are discussed in FIGS. 4A through 4F, which illustrate an exemplary fabrication process of the back-side layers of the back-side-of-die, through-wafer guided-wave optical clock distribution systems in FIGS. 1A, 2, and 3.

The device substrate 170 can be a substrate that can be used to support back-side-of-die, through-wafer guided-wave optical clock distribution system 100. In general, materials that exhibit transparency to a particular optical wavelength of light (e.g., clock signal) can serve as the device substrate 170, as the optical clock signal 197 is propagated through the device substrate 170 during operation of the back-side-of-die, through-wafer guided-wave optical clock distribution system 100. For example, the device substrate 170 can include materials such as, but not limited to, silicon, silicon compounds, germanium, germanium compounds, gallium, gallium compounds, indium, indium compounds, or other semiconductor materials and/or compounds. Therefore, an example device substrate 170 composed of silicon can be transparent to optical wavelengths greater than or equal to 1.1 microns ($\mu$m). In addition, the device substrate 170 can include non-semiconductor substrate materials, such as, but not limited to, ceramics and organic boards.

The packaging layer 180 can include, but is not limited to, appropriate mating structures for the device substrate 170. The packaging layer 180 can include additional components such as, but not limited to die pads, leads, input/output components, waveguides, (e.g., optical and RF), air gaps, planar waveguides, polymer waveguides, optical waveguides, having optical coupling elements such as diffractive grating couplers and mirrors disposed adjacent or within the optical waveguide, photodetectors, diffractive grating couplers, and optical sources such as VCSELs and LEDs.

The printed wiring board substrate 187 can include, but is not limited to, a printed wiring board, a printed wiring/waveguide board, and appropriate mating substrates. The printed wiring board substrate 187 can include additional components such as, but not limited to, die pads, leads, input/output components, waveguides, (e.g., optical and RF), air gaps, planar waveguides, polymer waveguides, optical waveguides, having optical coupling elements such as diffractive grating couplers and mirrors disposed adjacent or within the optical waveguide, photodetectors, diffractive grating couplers, and optical sources such as VCSELs and LEDs The optical via 185 can include materials that exhibit (a) transparency to a particular optical wavelength of light, (b) process compatibility with standard microelectronic fabrication processes, (c) suitable mechanical strength, flexibility, and durability, and (d) sufficient lifetime and/or reliability characteristics. Particularly, the optical via 185 can be made of dielectric materials such as, but not limited to, silicon dioxide, silicon nitride, polyarylenes or other polymer materials, or porous low-k dielectrics, or semiconductor or other crystalline materials.

Optionally, the optical via 185 can be coated with an anti-reflective coating comprising alternating layers of dielectric materials the same as or similar to the materials for the optical via 185, for example. The optical via 185 can traverse the device circuitry layer 190, as shown in FIG. 1A. In an alternate embodiment (not shown), the optical via 185 could traverse the entire device substrate 170. Furthermore, the optical via 185 could be filled with more than one dielectric material, where the outer via wall is first coated with a dielectric material of refractive index less than the surrounding device substrate 170 and the inner via region is composed of a dielectric material with a refractive index greater than that of the outer via wall such that a vertical through-wafer optical waveguide is formed. Alternatively, the outer via wall of the optical via 185 could be coated with a metal with high reflectivity to laterally confine the light propagating in the inner via region.

The optical via 185 can be defined on device substrate 170 through multiple fabrication processes such as, but not limited to, chemical vapor deposition (CVD), through plasma based deposition systems, through plasma based etch systems such as an inductively-coupled plasmas (ICP), photo-definition, or wet chemical etching.

The device circuitry 190 can be fabricated of any single layer or layers of different metals, metal composites, dielectrics, superconductors, organic conductors, or combinations thereof, appropriate for the construction of any device having the back-side-of-die, through-wafer guided-wave optical clock distribution system 100. The metals and metal composites include, but are not limited to, copper, copper alloys, or aluminum and aluminum alloys, and combinations thereof. Furthermore, the device circuitry 190 can include components such as, but not limited to, transistors, resistors, latches, photodetectors, and capacitors.

The device circuitry 190 can be defined through multiple fabrication processes such as, but not limited to, photo-definition, wet chemical etching, ion implantation, sputtering, CVD, plasma based deposition systems, or any process associated with microelectronic manufacturing technology.

The first cladding layer 130 and second cladding layer 160 can include materials that have a lower index of refraction than the core layer 135. The first cladding layer 130 and second cladding layer 160 can include, but are not limited to, organic and inorganic materials. Such materials include, but are not limited to, silicon dioxide, silicon nitride, polyarylenes, ether, parylenes, polynorbomenes, polyimides, epoxies, or other polymer materials or porous low-k dielectric materials, or semiconductor or other crystalline materials.

The first cladding layer 130 and second cladding layer 160 act as cladding for core layer 135 during normal operation of the back-side-of-die, through-wafer guided-wave optical clock distribution system 100. The operational optical wavelengths of light can be wavelengths greater than 1.1 µm in the case where the device substrate 170 is silicon, for example. The operational optical wavelengths of light can be wavelengths greater than or equal to 365 nm in the case where the device substrate 170 is fused silica, for example. In short, the optical wavelengths of light can correspond to those wavelengths for which the first cladding layer 130 and second cladding layer 160 are transparent (i.e., do not absorb optical energy propagating at the optical wavelengths of light).

In another embodiment, the first cladding layer 130 can act as a write-wavelength vertical reflection absorption layer for capturing light reflection during photo-definition (i.e., writing) of the core layer 135.

The first cladding layer 130 and second cladding layer 160 can be deposited using any suitable technique such as, for example, spin coating, doctor-blading, sputtering, lamination, screen or stencil-printing, CVD, or through plasma based deposition systems.

Figure 1B:
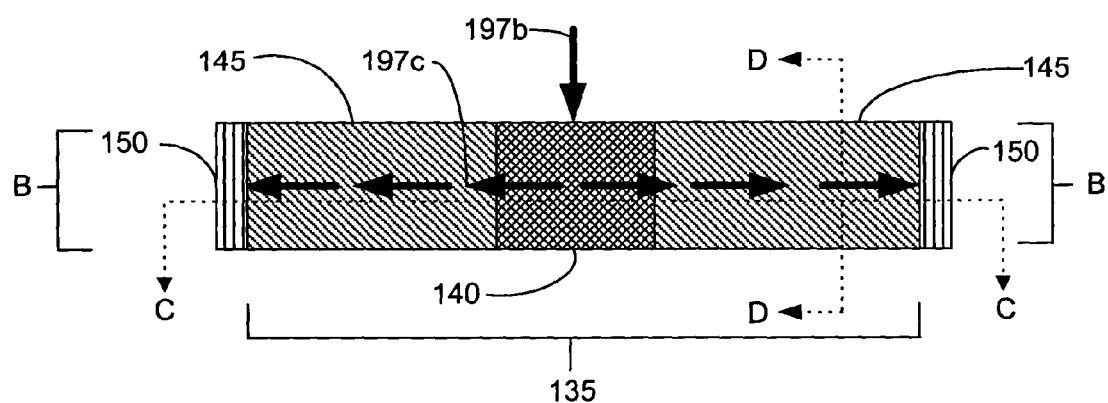
FIG. 1B is an isolated view of the cross-sectional view of the core layer level B—B of the back-side-of-die, through-wafer guided-wave optical clock distribution system 100.
Figure 1C:
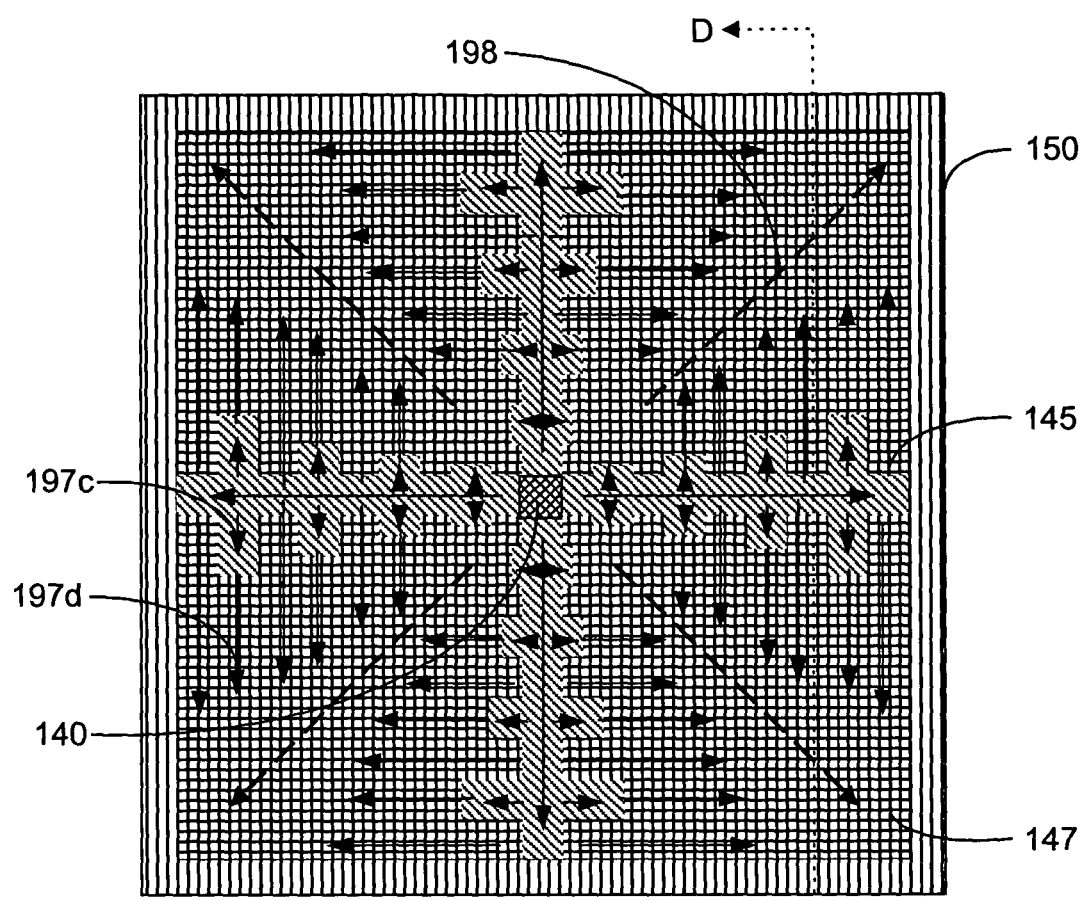
FIG. 1C is a cross-sectional view of core layer level B—B in the C—C direction, as shown by the arrows in FIG. 1B.
Figure 1D:
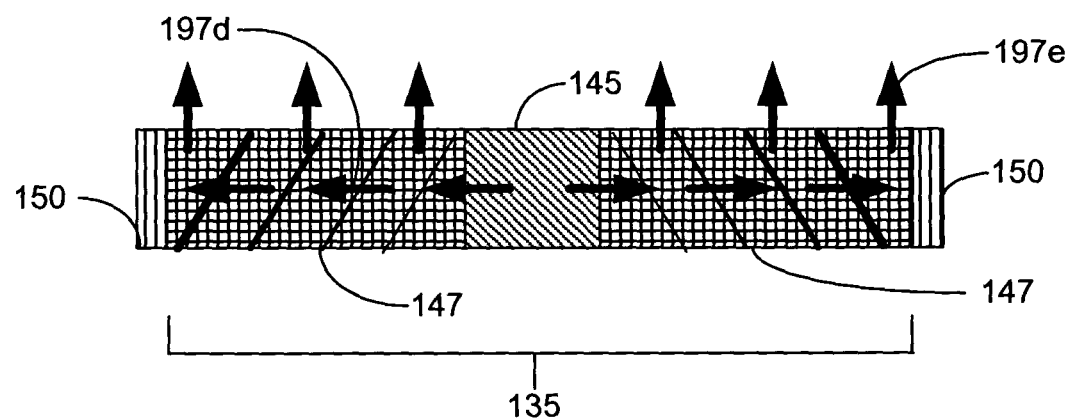
FIG. 1D is a cross-sectional view of the core layer level B—B in the D—D direction as shown by the arrows in FIGS. 1B and 1C.

FIG. 1B is an isolated view of the cross-sectional view of the core layer level B—B of the back-side-of-die, through-wafer guided-wave optical clock distribution system 100. FIG. 1C is a cross-sectional view of core layer level B—B in the C—C direction, as shown by the arrows in FIG. 1B. FIG. 1D is a cross-sectional view of the core layer level B—B in the D—D direction as shown by the arrows in FIGS. 1B and 1C.

The core layer 135 can include, but is not limited to, multiplexed vertical-to-horizontal input diffraction gratings 140, horizontal-to-horizontal diffraction gratings 145, and multiplexed horizontal-to-vertical output diffraction gratings 147 as shown in the isolated views of the core layer level B—B in FIGS. 1B through 1D. Thus, the optical clock signal 197a . . . 197e enters the multiplexed vertical-to-horizontal input diffraction grating 140, is distributed from a vertical (i.e., perpendicular to the device surface) to horizontal (i.e., parallel to the device surface) orientation in a plurality of directions towards horizontal-to-horizontal diffraction gratings 145, and is distributed to the multiplexed horizontal-to-vertical output diffraction gratings 147 to be distributed vertically towards the device circuitry 190 through the device substrate 170. In this manner, the core layer 135 functions as a guiding medium for the optical clock signal 197a . . . 197e to travel through.

The core layer 135 can be fabricated from materials such as, but not limited to, polyarylenes, ether, parylenes, polynorbomenes, polyimides, epoxies, or other polymer materials or nanoporous low-k dielectric materials. In general, materials that exhibit (a) transparency to a particular wavelength of light, (b) process compatibility with other materials such that a contrast in refractive index is achieved, (c) process compatibility with standard microelectronic fabrication processes, (d) suitable mechanical strength, flexibility, and durability, (e) sufficient lifetime and/or reliability characteristics, and (f) the ability to interferometrically or photolithographically record lines or regions of refractive index modulation, can serve as the core layer material.

More particularly, the core layer 135 can include materials such as, for example, polymer materials, silver halide photographic emulsions, photoresists such as dichromated gelatin, photopolymers such as polymethyl methacrylate (PMMA) or Dupont HRF photopolymer films, thermoplastic materials, photochromic materials such as crystals, glasses or organic substrates, photodichroic materials, and photorefractive crystals such as lithium niobate, or nanoporous low-k dielectric materials for example. These materials have the characteristic of creating a refractive index modulation through a variety of mechanisms, all of which result in the creation of a phase or absorption or mixed grating. Other suitable materials are described in T. K. Gaylord and M. G. Moharam, *Proc. IEEE*, vol. 73, pp. 894–937, May 1985, which is herein incorporated by reference. The core layer 135 can be disposed by spin coating or lamination techniques, for example.

The vertical-to-horizontal input diffraction gratings 140 and horizontal-to-vertical output diffraction gratings 147 can be planar (or volume) gratings for example. Each grating can also be a multiplexed diffraction grating, for example, where multiple gratings each with fringes corresponding to a unique grating design are recorded. The vertical-to-horizontal input diffraction gratings 140 can be recorded such that preferential distribution of the optical clock signal 197 into multiple horizontal-to-horizontal diffraction gratings 145 is achieved. Preferably, the horizontal-to-horizontal diffraction gratings 145 are index-defined non-preferential square-wave gratings. Also, by increasing the refractive index modulation along the length of the horizontal-to-horizontal diffraction gratings 145, the majority of optical power propagating in the horizontal-to-horizontal diffraction gratings 145 is coupled into the horizontal-to-vertical output diffraction gratings 147 by the end of each horizontal-to-horizontal diffraction grating 145. The refractive index modulation also increases along the direction of light propagation in the horizontal-to-vertical output diffraction grating 147 to ensure an optical clock signal 197 with a uniform level of output power.

The vertical-to-horizontal input diffraction grating 140, horizontal-to-horizontal diffraction gratings 145, and horizontal-to-vertical output diffraction gratings 147 can be formed by, for example, holographic exposure of the core layer during one or a series of interferometric exposure and photo-definition steps.

In an alternate embodiment (not shown), the first cladding layer 130 can include, but is not limited to, multiplexed vertical-to-horizontal input diffraction gratings, horizontal-to-horizontal diffraction gratings, and multiplexed horizontal-to-vertical output diffraction gratings. In this alternate embodiment, the core layer 135 may not contain diffraction gratings. Additionally, distribution of the optical clock signal 197 can occur on the first cladding layer 130 analogously or similarly to the distribution of the optical clock signal 197 on the core layer 135 described above. Thus, materials that exhibit (a) transparency to a particular wavelength of light, (b) process compatibility with other materials such that a contrast in refractive index is achieved, (c) process compatibility with standard microelectronic fabrication processes, (d) suitable mechanical strength, flexibility, and durability, (e) sufficient lifetime and/or reliability characteristics, and (f) the ability to interferometrically or photolithographically record lines or regions of refractive index modulation, can serve as the first cladding layer 130 in this alternate embodiment.

In yet another embodiment (not shown), the second cladding layer 160 can include, but is not limited to, multiplexed vertical-to-horizontal input diffraction gratings, horizontal-to-horizontal diffraction gratings, and multiplexed horizontal-to-vertical output diffraction gratings. In this alternate embodiment, the core layer 135 may not contain diffraction gratings. Additionally, distribution of the optical clock signal 197 can occur on the second cladding layer 160 analogously or similarly to the distribution of the optical clock signal 197 on the core layer 135 described above. Thus, materials that exhibit (a) transparency to a particular wavelength of light, (b) process compatibility with other materials such that a contrast in refractive index is achieved, (c) process compatibility with standard microelectronic fabrication processes, (d) suitable mechanical strength, flexibility, and durability, (e) sufficient lifetime and/or reliability characteristics, and (f) the ability to interferometrically or photolithographically record lines or regions of refractive index modulation, can serve as the second cladding layer 160 in this alternate embodiment.

The horizontal reflection absorption layer 150 can include materials that include the characteristic of being able to absorb horizontal reflections at the optical clock signal 197 wavelengths during normal operation of the back-side-of-die, through-wafer guided-wave optical clock distribution system 100. The horizontal reflection absorption layer 150 could include materials such as, for example, polymer, optical fiber, or other organic materials with high OH content.

The horizontal reflection absorption layer 150 can be disposed by a series of fabrication steps including, but not limited to, CVD, through plasma based deposition systems, photo-definition, or wet chemical etching.

The vertical reflection absorption layer 165 can include materials having the characteristic of absorbing secondary reflections at the optical clock signal 197 wavelengths during normal operation of the back-side-of-die, through-wafer guided-wave optical clock distribution system 100. Examples of such materials include, but are not limited to, the same or similar materials for the horizontal reflection absorption layer 150.

The vertical reflection layer 165 can be deposited using suitable techniques such as, for example spin coating, doctor-blading, sputtering, lamination, screen or stencil-printing, CVD, or through plasma based deposition.

Additional layers and/or components can be added to the back-side of the back-side-of-die, through-wafer guided-wave optical clock distribution system 100. For example, thermal grease and a heat sink (not shown) can be attached to the back-side of the vertical reflection absorption layer 165 for further heat removal during normal operation.

Having described the components of back-side-of-die, through-wafer guided-wave optical clock distribution system 100, its normal operation is explained in the following high level description, which is for purposes of illustration only and is without limitation.

The optical clock signal 197a, generated off-chip, is distributed on printed wiring board substrate 187 having at least one optical waveguide 195 (only one is shown) and optical power couplers 194 (only one is shown) including, but not limited to, diffraction grating couplers or reflection mirror couplers, for example. The optical clock signal 197b is outcoupled from the printed wiring board optical waveguide 195 through optical via 185 and device substrate 170 to the core layer 135 at the vertical-to-horizontal input diffraction grating 140. Alternately, the optical clock signal 197b could be out-coupled from other off-chip sources (not shown) on printed wiring board substrate 187. An alternate embodiment (not shown) could have multiple points of coupling from printed wiring board substrate 187 to multiple optical vias and vertical-to-horizontal input diffraction gratings at various locations on the device.

The vertical-to-horizontal input diffraction grating 140 distributes the vertical optical clock signal 197b entering the core layer 135 laterally in a plurality of directions as shown in FIGS. 1B and 1C. Thus, the optical clock signal 197c is uniformly distributed through the core layer 135. The horizontally propagating optical clock signal 197c is then distributed within the core layer 135 by the horizontal-to-horizontal diffraction gratings 145. As shown in the layout in FIG. 1C, the horizontal-to-horizontal diffraction gratings 145 can be recorded with a square-wave profile as part of an intermediate multi-grating fanout pattern distributed across the core layer 135 for distribution of the optical clock signal 197c. The laterally oriented optical clock signal 197d then interacts with the plurality of horizontal-to-vertical output diffraction gratings 147, which direct the light vertically through the device substrate 170 towards the device circuitry 190 as shown in FIG. 1D. Accordingly, there is blanket illumination of optical power 197e of the device circuitry 190 with a known, predictable skew along the line of maximum, known time-of-flight skew 198 as shown in FIG. 1C.

EXAMPLE 2

Figure 2:
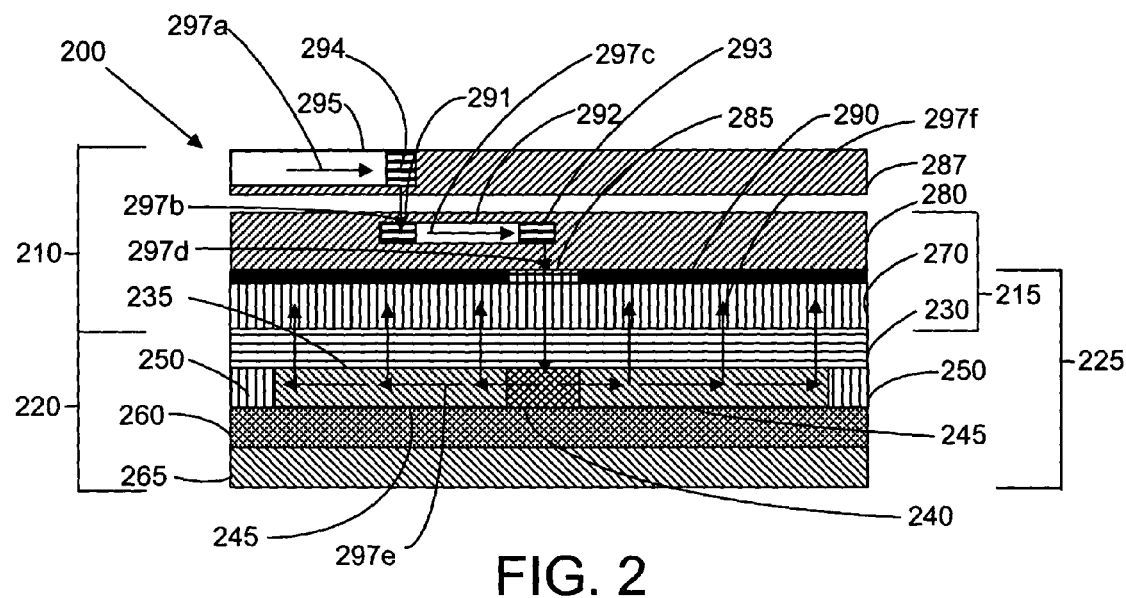
FIG. 2 is a cross-sectional view of another representative embodiment of a back-side-of-die, through-wafer guided-wave optical clock distribution system with off-chip optical clock signal generation.

FIG. 2 is a cross-sectional view of another representative embodiment of a back-side-of-die, through-wafer guided-wave optical clock distribution system 200 with off-chip optical clock signal generation, where chip-level distribution of the optical clock signal occurs prior to coupling the signal to the back-side-of-die core layer.

The back-side-of-die, through-wafer guided-wave optical clock distribution system 200 includes, but is not limited to, front-side layers 210 and back-side layers 220. The front-side layers 210 include, but are not limited to, a device substrate 270, a packaging layer 280, a printed wiring board substrate 287, an optical via 285, and device circuitry 290. The back-side layers 220 include, but are not limited to, a first cladding layer 230, a core layer 235, a horizontal reflection absorption layer 250, a second cladding layer 260, and a vertical reflection absorption layer 265. The core layer 235 includes, but is not limited to, a vertical-to-horizontal input diffraction grating 240, a horizontal-to-horizontal diffraction grating 245, and a horizontal-to-vertical output diffraction grating (not shown). More particularly, the primary structure 225 includes, but is not limited to, the optical via 285, the device circuitry 290, the device substrate 270, and the back-side layers 220. Specifically, the package layer 280, the optical via 285, the device circuitry 290, and the device substrate 270 could be included in an integrated circuit device 215, for example.

The device substrate 270, packaging layer 280, printed wiring board substrate 287, optical via 285, device circuitry 290, first cladding layer 230, core layer 235, horizontal reflection absorption layer 250, second cladding layer 260, and vertical reflection absorption layer 265, discussed in relation to FIG. 2, are analogous or similar to the device substrate 170, packaging layer 180, printed wiring board substrate 187, optical via 185, device circuitry 190, first cladding layer 130, core layer 135, horizontal reflection absorption layer 150, second cladding layer 160, and vertical reflection absorption layer 165, discussed in reference to FIGS. 1A through 1D above. Therefore, additional discussion of these components will not be presented in relation to back-side-of-die, through-wafer guided-wave optical clock distribution system 200. The reader is directed to the discussion presented above for further explanation of these components.

Printed wiring board substrate 287 includes at least one optical waveguide 295 (only one is shown) and optical power couplers 294 (only one is shown) including, but not limited to, diffraction grating couplers or reflection mirror couplers, for example. The packaging layer 280 includes at least one optical waveguide 292 (only one is shown) and optical power couplers 291 and 293 (only two are shown) including, but not limited to, diffraction grating couplers or reflection mirror couplers, for example. In this embodiment, the optical clock signal 297a is distributed through a printed wiring board waveguide 295, outcoupled to a package-level waveguide 292 as optical clock signal 297b, where it is distributed as optical clock signal 297c within the packaging layer 280 before being coupled into the optical via 285 to the core layer 235 as optical clock signal 297d. An alternate embodiment (not shown), may include multiple package-level waveguides which couple the optical clock signal to multiple optical vias at various locations on the device.

Distribution of the optical clock signal 297 on the core layer 235 in this embodiment illustrated in FIG. 2 is analogous or similar to the distribution of the optical clock signal 197 on core layer 135, as illustrated in FIGS. 1A through 1D. Therefore, additional discussion of operation of back-side-of-die, through-wafer guided-wave optical clock distribution system 200 will not be presented. The reader is directed to the discussion presented above for further explanation of this operation.

EXAMPLE 3

Figure 3:
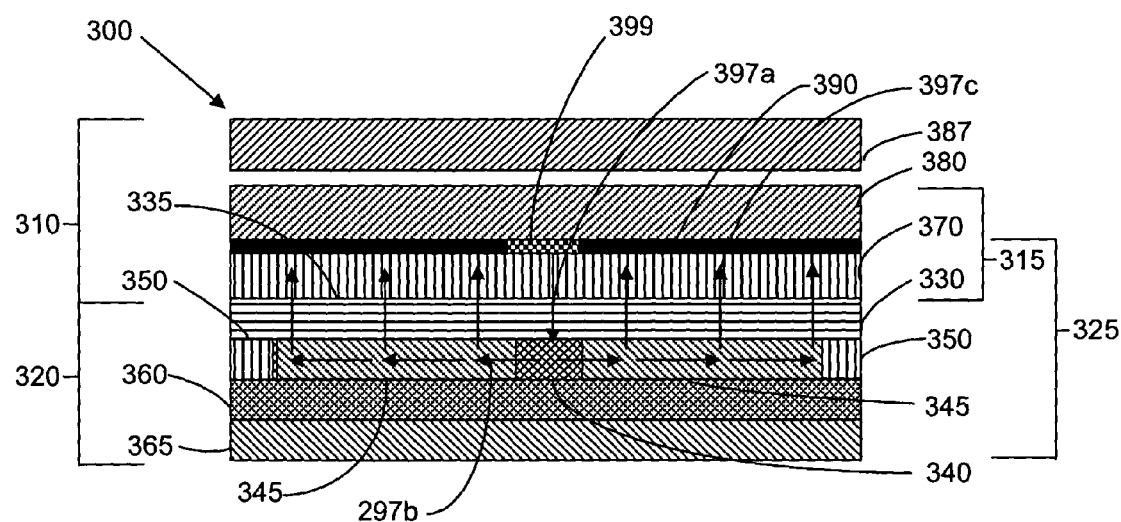
FIG. 3 is a cross-sectional view of yet another representative embodiment of a back-side-of-die, through-wafer guided-wave optical clock distribution system with on-chip optical clock signal generation.

FIG. 3 is a cross-sectional view of yet another representative embodiment of a back-side-of-die, through-wafer guided-wave optical clock distribution system 300 with on-chip optical clock signal generation.

The back-side-of-die, through-wafer guided-wave optical clock distribution system 300 includes front-side layers 310 and back-side layers 320. The front-side layers 310 include, but are not limited to, a device substrate 370, a packaging layer 380, a printed wiring board substrate 387, an optical source 399, and device circuitry 390. The back-side layers 320 include, but are not limited to, a first cladding layer 330, a core layer 335, a horizontal reflection absorption layer 350, a second cladding layer 360, and a vertical reflection absorption layer 365. The core layer 335 includes, but is not limited to, a vertical-to-horizontal input diffraction grating 340, a horizontal-to-horizontal diffraction grating 345, and a horizontal-to-vertical output diffraction grating (not shown). More particularly, the core structure 325 includes, but is not limited to, the optical source 399, the device circuitry 390, the device substrate 370, and the back-side layers 320. Specifically, the package layer 380, the optical source 399, the device circuitry 390, and the device substrate 370 could be included in an integrated circuit device 315, for example.

The device substrate 370, packaging layer 380, printed wiring board substrate 387, device circuitry 390, first cladding layer 330, the core layer 335, horizontal reflection absorption layer 350, second cladding layer 360, and vertical reflection absorption layer 365, discussed in relation to FIG. 3, are analogous or similar to the device substrate 170, packaging layer 180, printed wiring board substrate 187, device circuitry 190, first cladding layer 130, the core layer 135, horizontal reflection absorption layer 150, second cladding layer 160, and vertical reflection absorption layer 165, discussed in reference to FIGS. 1A through 1D above. Therefore, additional discussion of these components will not be presented in relation to back-side-of-die, through-wafer guided-wave optical clock distribution system 300. The reader is directed to the discussion presented above for further explanation of these components.

In this embodiment, the optical clock signal 397a is generated on the device substrate by an optical source 399. The optical clock source 399 may be a structure such as, but not limited to, a monolithically-integrated optical source or a hybridly attached optical source. The optical source generates an on-chip optical clock signal 397a, which propagates through device substrate 370 to core layer 335 as optical clock signal 397b.

Distribution of the optical clock signal 397 on core layer 335 in this embodiment illustrated in FIG. 3 is analogous or similar to the distribution of the optical clock signal 197, as illustrated in FIGS. 1A through 1D. Therefore, additional discussion of operation of back-side-of-die, through-wafer guided-wave optical clock distribution system 300 will not be presented. The reader is directed to the discussion presented above for further explanation of this operation.

For the purposes of illustration only, and without limitation the back-side layers 420 of the back-side-of-die, through-wafer guided-wave optical clock distribution systems in FIGS. 1A, 2, and 3 are described with particular reference to the below-described exemplary fabrication method. As the back-side layers in FIGS. 1A, 2, and 3 are the same or similar, the back-side layers 420 serve as representative layers in the process illustrated in FIGS. 4A through 4F. In addition, the front-side layers in FIGS. 1A, 2, and 3 are represented by front-side layers 410 in FIGS. 4A through 4F for the sake of focusing on the back-side layers 420.

For clarity, some portions of the fabrication process are not included in FIGS. 4A through 4F. For example, photolithography or similar techniques can be used to define the core layer. In this regard, the pattern can be defined by depositing material onto the surface of the front-side layers 410 and/or the first cladding layer 430 using techniques such as, for example, sputtering, CVD, plasma based deposition systems, evaporation, and electron-beam systems. Furthermore, the pattern can then be removed using reactive ion etching techniques (RIE), for example.

The following fabrication process is not intended to be an exhaustive list that includes every step required for fabricating the back-side layers 420 of the back-side-of-die, through-wafer guided-wave optical clock distribution systems in FIGS. 1A, 2, and 3. In addition, the fabrication process is flexible because the process steps can be performed in a different order than the order illustrated in FIGS. 4A through 4F.

Figure 4A:
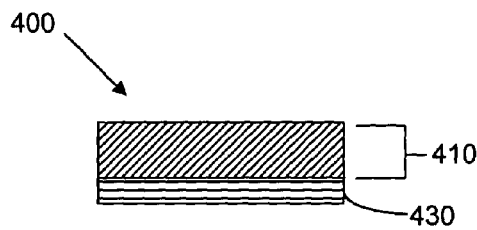
FIGS. 4A through 4F are cross-sectional views to illustrate a representative process for fabricating the back-side layers of the back-side-of-die, through-wafer guided-wave optical clock distribution systems in FIGS. 1A, 2, and 3.

FIGS. 4A through 4F are cross-sectional views of the fabrication process relative to the views illustrated in FIGS. 1A, 2, and 3. FIG. 4A illustrates the first cladding layer 430 disposed on the front-side layers 410. Techniques for disposing first cladding layer 430 include, but are not limited to, spin coating, doctor-blading, sputtering, lamination, screen or stencil-printing, CVD, or through plasma based deposition systems, for example.

Figure 4D:
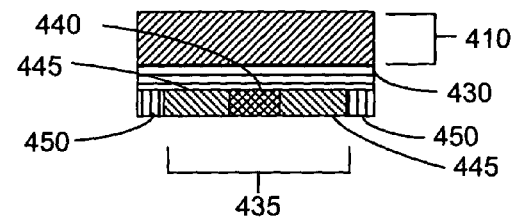
Figure 4B:
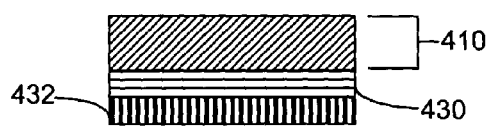

FIG. 4B illustrates the core layer material 432 disposed on the first cladding layer 430. Techniques for disposing core layer material 432 include, but are not limited to, spin coating or lamination techniques, for example.

Figure 4E:
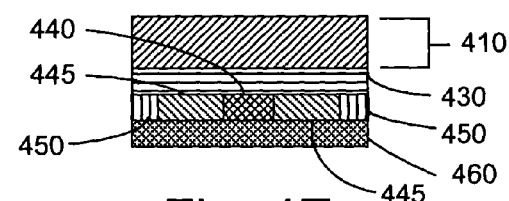
Figure 4C:
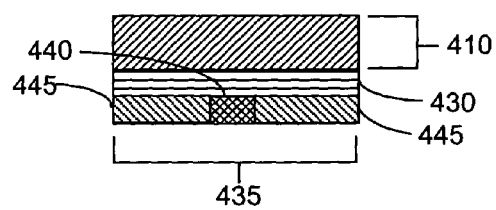

FIG. 4C illustrates the defining of the multiplexed vertical-to-horizontal input diffraction gratings 440, the horizontal-to-horizontal diffraction gratings 445, and the multiplexed horizontal-to-vertical output diffraction gratings (not shown) in the core layer 435. Techniques for defining the vertical-to-horizontal input diffraction gratings 440, the horizontal-to-horizontal diffraction gratings 445, and the horizontal-to-vertical output diffraction gratings (not shown) in the core layer 435 include, but are not limited to, photo-definition and interferometric recording, for example.

FIG. 4D illustrates the replacement of the edge of the core layer 435 around the edge of the back-side-of-die, through-wafer guided-wave optical clock distribution system 400 with the horizontal reflection absorption layer 450. Techniques for removal of the core layer 435 include, but are not limited to, photo-definition, and wet chemical etching, for example.

FIG. 4E illustrates the second cladding layer 460 disposed on the core layer 435 and horizontal reflection absorption layer 450. Techniques for disposing the second cladding layer 460 include, but are not limited to, spin coating, doctor-blading, sputtering, lamination, screen or stencil-printing, CVD, or through plasma based deposition systems, for example.

Figure 4F:
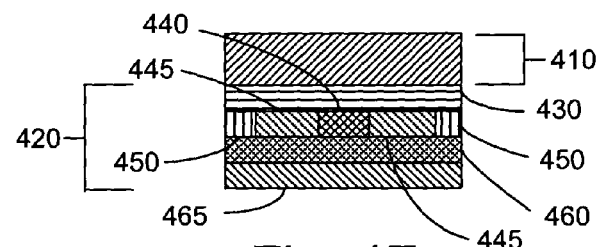

FIG. 4F illustrates the vertical reflection absorption layer 465 disposed on the second cladding layer 460. Techniques for disposing the vertical reflection absorption layer 465 include, but are not limited to, spin coating, doctor-blading, sputtering, lamination, screen or stencil-printing, CVD, or through plasma based deposition, for example.

In another exemplary fabrication method, multiplexed vertical-to-horizontal input diffraction gratings 440, horizontal-to-horizontal diffraction gratings 445, and multiplexed horizontal-to-vertical output diffraction gratings may be defined on the first cladding layer 430. The core layer material 432 might not have diffraction gratings defined on it.

In yet another exemplary fabrication method, multiplexed vertical-to-horizontal input diffraction gratings 440, horizontal-to-horizontal diffraction gratings 445, and multiplexed horizontal-to-vertical output diffraction gratings may be defined on the second cladding layer 460. The core layer material 432 might not have diffraction gratings defined on it.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

Therefore, having thus described the invention, at least the following is claimed:

1. A structure for unfocused guided-wave optical clock distribution, comprising:
   an integrated circuit device;
   a first cladding layer disposed on the back-side of the integrated circuit device; and
   a core layer disposed on the first cladding layer, the core layer including:
      at least one vertical-to-horizontal input diffraction grating configured to diffract a clock signal from the vertical plane to the horizontal plane in a plurality of directions, such that the clock signal is uniformly distributed through the core layer;
      at least one horizontal-to-horizontal diffraction grating configured to diffract the clock signal through the horizontal plane in a plurality of directions, such that the clock signal is uniformly distributed through the core layer; and
      at least one horizontal-to-vertical output diffraction grating configured to diffract the clock signal from the horizontal plane to the vertical plane in a plurality of directions, such that the clock signal is uniformly distributed through the core layer.

2. The structure of claim 1, wherein the first cladding layer is a write-wavelength vertical reflection absorption layer.

3. The structure of claim 1, further comprising:
   a second cladding layer adjacent to the core layer.

4. The structure of claim 1, further comprising:
   a horizontal reflection absorption layer adjacent to the core layer.

5. The structure of claim 1, further comprising:
   at least one chip-level detector on the integrated circuit device.

6. The structure of claim 1, further comprising:
   at least one chip-level optical via; and
   a printed wiring board substrate connected to the integrated circuit device.

7. The structure of claim 6, wherein the at least one optical via is a dielectric filled through-wafer via.

8. The structure of claim 1, further comprising:
   at least one chip-level optical source.

9. A structure for unfocused guided-wave optical clock distribution, comprising:
   an integrated circuit device;
   a first cladding layer disposed on the back-side of the integrated circuit device, wherein the first cladding layer includes at least one vertical-to-horizontal input diffraction grating, at least one horizontal-to-horizontal diffraction grating, and at least one horizontal-to-vertical output diffraction grating;
   a core layer disposed on the first cladding layer; and
   a vertical reflection absorption layer adjacent to the first cladding layer,
   wherein at least one of the diffraction gratings is configured to diffract a clock signal in a plurality of directions, such that the clock signal is uniformly distributed through the first cladding layer.

10. The structure of claim 9, wherein the at least one vertical-to-horizontal input diffraction grating is a multiplexed grating and the at least one horizontal-to-vertical output diffraction grating is a multiplexed grating.

11. The structure of claim 9, wherein the first cladding layer is comprised of a grating selected from volume gratings, surface-relief gratings, multiplexed volume gratings, double-sided surface relief gratings, and combinations thereof.

12. The structure of claim 9, further comprising:
   a horizontal reflection absorption layer adjacent to the core layer.

13. The structure of claim 9, wherein the vertical reflection absorption layer absorbs at an optical wavelength which is transparent to the device substrate.

14. The structure of claim 9, wherein the structure for optical clock distribution is included in a microelectronic device.

15. The structure of claim 9, wherein the structure for optical clock distribution is included in an integrated optical device.

16. A structure for unfocused guided-wave optical clock distribution, comprising:
  an integrated circuit device;
  a first cladding layer disposed on the back-side of the integrated circuit device;
  a core layer disposed on the first cladding layer,
  a second cladding layer disposed on the core layer, wherein the second cladding layer includes at least one vertical-to-horizontal input diffraction grating, at least one horizontal-to-horizontal diffraction grating, and at least one horizontal-to-vertical output diffraction grating, and
  a vertical reflection absorption layer adjacent to the second cladding layer,
  wherein at least one of the diffraction gratings is configured to diffract a clock signal in a plurality of directions, such that the clock signal is uniformly distributed through the second cladding layer.

17. The structure of claim 16, wherein the vertical reflection absorption layer absorbs at an optical wavelength which is transparent to the device substrate.

18. The structure of claim 16, wherein the at least one vertical-to-horizontal input diffraction grating is a multiplexed grating and the at least one horizontal-to-vertical output diffraction grating is a multiplexed grating.

19. The structure of claim 16, wherein the first cladding layer is comprised of a grating selected from volume gratings, surface-relief gratings, multiplexed volume gratings, double-sided surface relief gratings, and combinations thereof.

20. The structure of claim 16, further comprising:
  a horizontal reflection absorption layer adjacent to the core layer.

21. A structure of claim 16, wherein the structure for optical clock distribution is included in a microelectronic device.

22. A structure of claim 16, wherein the structure for optical clock distribution is included in an integrated optical device.

23. A device, comprising:
  a structure having a core layer disposed on the back-side of the structure, at least one vertical-to-horizontal input diffraction grating within the core layer, at least one horizontal-to-horizontal diffraction grating within the core layer, at least one horizontal-to-vertical diffraction output grating within the core layer, and at least one cladding layer engaging the core layer,
  wherein an optical clock signal is propagated in a plurality of directions, such that the clock signal is uniformly distributed vertically through the structure to the core layer, into the at least one vertical-to-horizontal input diffraction grating and is then distributed in a plurality of directions, such that the clock signal is uniformly distributed laterally through the at least one horizontal-to-horizontal diffraction grating to the at least one horizontal-to-vertical output diffraction grating, which distributes the optical clock signal in a plurality of directions, such that the clock signal is uniformly distributed vertically back through the structure substrate.

24. The device of claim 23, wherein the structure for optical clock distribution is included in a microelectronic device.

25. The device of claim 23, wherein the structure for optical clock distribution is included in an integrated optical device.

26. The device of claim 23, further comprising:
  a horizontal reflection absorption layer adjacent to the core layer.

27. The device of claim 23, wherein the at least one vertical-to-horizontal input diffraction grating is a multiplexed grating and the at least one horizontal-to-vertical output diffraction grating is a multiplexed grating.

28. The device of claim 23, wherein the first cladding layer is comprised of a grating selected from volume gratings, surface-relief gratings, multiplexed volume gratings, double-sided surface relief gratings, and combinations thereof.

29. The device of claim 23 further comprising: a vertical reflection absorption layer adjacent to the second cladding layer.

30. The device of claim 29, wherein the vertical reflection absorption layer absorbs at an optical wavelength which is transparent to the device substrate.

31. A method for fabricating a device having unfocused guided-wave optical clock distribution comprising:
  providing a substrate having a first cladding layer disposed thereon;
  disposing a core layer on the first cladding layer;
  forming vertical-to-horizontal input diffraction gratings within the core layer;
  forming horizontal-to-horizontal diffraction gratings within the core layer; and
  forming horizontal-to-vertical output diffraction gratings within the core layer,
  disposing a second cladding layer on the core layer; and
  disposing a vertical reflection absorption layer on the second cladding layer,
  wherein at least one of the diffraction gratings is configured to diffract a clock signal in a plurality of directions, such that the clock signal is uniformly distributed through the core layer.

32. The method of claim 31, further comprising:
  etching away a portion of the core layer at the edges of the substrate and replacing it with a horizontal reflection absorption layer.

33. The method of claim 31, wherein the device includes at least one detector.

34. The method of claim 31, wherein the device includes an optical via and further comprises a packaging layer and a printed wiring board substrate.

35. The method of claim 31, wherein the device includes an optical source.

36. A method for fabricating a device having unfocused guided-wave optical clock distribution comprising:
  providing a substrate having a first cladding layer disposed thereon;
  forming vertical-to-horizontal input diffraction gratings within the first cladding layer;
  forming horizontal-to-horizontal diffraction gratings within the first cladding layer;
  forming horizontal-to-vertical output diffraction gratings within the first cladding layer;
  disposing a core layer on the first cladding layer;
  disposing a second cladding layer on the core layer; and
  disposing a vertical reflection absorption layer on the second cladding layer,
  wherein at least one of the diffraction gratings is configured to diffract a clock signal in a plurality of directions, such that the clock signal is uniformly distributed through the first cladding layer.

37. A method for fabricating a device having unfocused guided-wave optical clock distribution comprising:

providing a substrate having a first cladding layer disposed thereon;

disposing a core layer on the first cladding layer;

disposing a second cladding layer on the first cladding layer;

forming vertical-to-horizontal input diffraction gratings within the second cladding layer;

forming horizontal-to-horizontal diffraction gratings within the second cladding layer;

forming horizontal-to-vertical output diffraction gratings within the second cladding layer;

disposing a second cladding layer on the core layer; and disposing a vertical reflection absorption layer on the second cladding layer, wherein at least one of the diffraction gratings is configured to diffract a clock signal in a plurality of directions, such that the clock signal is uniformly distributed through the second cladding layer.

38. A system for fabricating a device having back-side-of-die, through-wafer optical clock distribution comprising:

means for providing a substrate having a first cladding layer disposed thereon;

means for disposing a core layer on the first cladding layer;

means for forming vertical-to-horizontal input diffraction gratings within the core layer;

means for forming horizontal-to-horizontal diffraction gratings within the core layer;

means for forming horizontal-to-vertical output diffraction gratings within the core layer;

means for disposing a second cladding layer on the core layer; and means for disposing a vertical reflection absorption layer on the second cladding layer, wherein at least one of the diffraction gratings is configured to diffract a clock signal in a plurality of directions, such that the clock signal is uniformly distributed through the core layer.

39. A structure for unfocused guided-wave optical clock distribution, comprising:

an integrated circuit device;

a first cladding layer disposed on the back-side of the integrated circuit device;

a core layer disposed on the first cladding layer, wherein the core layer includes at least one vertical-to-horizontal input diffraction grating, at least one horizontal-to-horizontal diffraction grating, and at least one horizontal-to-vertical output diffraction grating, wherein an optical clock signal is propagated vertically through the structure substrate to the core layer, into the at least one vertical-to-horizontal input diffraction grating and is then distributed laterally through the at least one horizontal-to-horizontal diffraction grating to the at least one horizontal-to-vertical output diffraction grating, which distributes the optical clock signal vertically back through the structure substrate;

at least one chip-level optical via; and a printed wiring board substrate connected to the integrated circuit device, wherein the first cladding layer is a write-wavelength vertical reflection absorption layer, wherein the at least one optical via is a dielectric filled through-wafer via, and wherein at least one of the diffraction gratings is configured to diffract a clock signal in a plurality of directions, such that the clock signal is uniformly distributed through the core layer.

* * * * *

UNITED STATES PATENT AND TRADEMARK OFFICE
CERTIFICATE OF CORRECTION

PATENT NO. : 7,016,569 B2 Page 1 of 1
APPLICATION NO. : 10/630411
DATED : March 21, 2006
INVENTOR(S) : Mule et al.

It is certified that error appears in the above-identified patent and that said Letters Patent is hereby corrected as shown below:

On the Title Page, Item (54),

Amend the Title to read: "BACK-SIDE-OF-DIE, THROUGH-WAFER GUIDED-WAVE OPTICAL CLOCK DISTRIBUTION NETWORKS, METHOD<u>S</u> OF FABRICATION THEREOF, AND USES THEREOF"

Item (57)
On line 6 of the Abstract, delete "an" and replace with --a--.

Column 5, line 28, delete "1115" and replace with --115--.

Column 15, delete the beginning of the claim "A structure" and replace with --The structure--.

Column 15, delete the beginning of the claim "A structure" and replace with --The structure--.

Signed and Sealed this

Twenty-second Day of August, 2006

JON W. DUDAS
*Director of the United States Patent and Trademark Office*